United States Patent Office 3,192,270
Patented June 29, 1965

---

3,192,270
PROCESS FOR THE MANUFACTURE OF PURE 4,4'-DI-(HYDROXY-PHENYL)-ALKANES
Karl-Heinrich Meyer, Krefeld-Bockum, and Hermann Schnell, Krefeld-Uerdingen, Germany, assignors to Farbenfabriken Bayer Aktiengesellschaft, Leverkusen, Germany, a German corporation
No Drawing. Filed Feb. 21, 1962, Ser. No. 174,712
Claims priority, application Germany, Dec. 10, 1955, F 19,036
3 Claims. (Cl. 260—619)

This a continuation-in-part of our application Serial Number 626,088, filed December 4, 1956, now abandoned.

Phenol forms with carbonyl compounds such as ketones or aldehydes, under the influence of strong mineral acids or Friedel-Crafts catalysts, condensation products of the di-(monohydroxyaryl)-alkane type which are also known as bisphenols. Thus 2,2-bis(4-hydroxyphenyl)propane, also called bisphenol A, for example, is formed from phenol and acetone under the action of such catalysts or condensing agents. In order to accelerate the condensation, catalysts may be added, particularly sulphur compounds such as mercaptans, thiocarboxylic acids and the like. Even when using the aforesaid catalysts, more or less substantial amounts of resinous compounds and colored substances are however formed as by-products which have to be removed from the reaction products, particularly if the latter are to be used for the manufacture of plastics.

The condensation is usually carried out with the use of an excess of phenol at a temperature which is as low as possible. The working up is in most cases effected by removing the excess phenol from the neutralized reaction mixture by distillation or extraction, for example, with water. The resins and colored impurities thereby remain in the condensation product. The crude condensation product thus obtained must therefore be purified by crystallization from organic solvents. Organic solvents such as toluene or acetic acid or mixtures of methanol and water are usually employed for effecting the recrystallization. Of these solvents, mixtures of acetic acid and water or methanol and water are not very suitable, since they dissolve the resinous compounds obtained as impurities only with difficulty, thus having a small purifying effect. Toluene, while dissolving the resinous by-products, is not suitable for completely removing the colored impurities. Moreover, the solubility of the condensation products in cold toluene is such that substantial amounts of the condensation product to be purified remain in the mother liquor.

According to another known process, the condensation of phenol with carbonyl compounds is carried out with such a quantity of excess phenol as to obtain after condensation a crystal pulp containing phenol-containing bisphenol in addition to excess phenol. The crystals are centrifuged off and washed with liquid phenol. Then the phenol is distilled off, and the bisphenol remains as a residue.

The disadvantages of this process consist on the one hand in the comparatively high solubility of the phenol-containing bisphenol in liquid phenol. A substantial portion of bisphenol is thereby dissolved by washing. On the other hand, the bisphenol obtained is not sufficiently pure, in spite of its maximum melting point, to be used for purposes requiring a particularly high degree of purity such as, for example, for the manufacture of polycarbonic acid esters according to the processes described in United States patent applications Serial No. 461,938, filed October 12, 1954, now Patent No. 3,028,365; 557,256, filed January 4, 1956; 572,802, filed March 21, 1956, now Patent 3,136,741; 614,340, filed October 8, 1956, now Patent 3,022,272, and 596,398, filed July 9, 1956, now Patent 2,946,766.

Furthermore another known process for preparing di-(hydroxy-phenyl)-alkanes comprises reacting an aliphatic aldehyde or ketone, for example, dimethyl ketone, with an excess of phenol in the presence of an acid catalyst, such as sulphuric acid or hydrogen chloride, in known manner. The resulting reaction mixture comprising, for example, 2,2-di-(4-hydroxy-phenyl)-propane and unreacted phenol, is quenched with water to produce an aqueous mixture containing about 70 percent water. Said aqueous mixture is neutralized by the addition thereto of an alkali, such as aqueous sodium hydroxide, and permitted to stratify at elevated temperature, for instance 50° C., thereby forming a liquid phenolic phase containing phenol and about 95% of the bis-(hydroxy-phenyl)-propane originally present in the reaction mixture and a liquid phase containing water, phenol and sodium chloride. The phenolic phase is cooled to room temperature, thereby crystallizing out di-(hydroxy-phenyl)-propane in the form of a 2,2-di-(4-hydroxy-phenyl)-propane-phenol adduct containing equimolar amounts of the bisphenol and phenol. The adduct is separated, for instance, by centrifuging. Water is added to the separated adduct in a great excess and the resulting mixture is slightly heated, resulting in the liberation of phenol from said adduct, thereby forming a mixture containing 2,2-di-(hydroxy-phenyl)-propane as a solid phase and dilute aqueous phenol as a liquid phase. The solid phase is separated from the mixture, the resulting 2,2-di-(hydroxy-phenyl)-propane is dried. It is relatively pure and free of discoloration but still contains traces of detectable impurities.

The principal object of the present invention is to provide a process that is an improvement of the foregoing process for the manufacture of substantially pure bis(4-hydroxyphenyl)alkanes having the formula

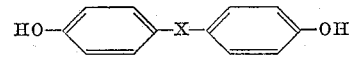

wherein X is a radical of the group consisting of

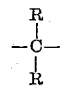

and

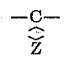

in which formulae R is a radical of the group consisting of hydrogen, unbranched and branched monovalent aliphatic hydrocarbon radicals containing up to 10 carbon atoms, monovalent cycloaliphatic radicals, monovalent araliphatic hydrocarbon radicals having up to 4 carbon atoms as side chains, phenyl and furyl, and Z are the carbon and hydrogen atoms required to complete a cycloaliphatic ring. In accordance with the process of the present invention, this object is attained by reacting a carbonyl compound of the group consisting of

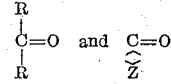

with phenol in the presence of excess phenol and an acid catalyst, heating the resulting reaction mixture at a temperature above the melting point of the resulting crystallized reaction product, neutralizing the heated reaction mixture with an aqueous alkaline material, removing the resulting salt-containing aqueous phase formed during neutralization, cooling the separated organic phase, thereby obtaining the crystalline adduct of the bis(4-hydroxyphenyl)alkane and phenol in a mother liquor consisting substantially of phenol, separating said crystalline adduct from said mother liquor and removing phenol as such from said separated adduct to obtain the bis(4-hydroxyphenyl)alkane. The improvement of the present invention consists essentially in adding hot water to the liquid organic phase that is obtained when the bisphenol is separated from the salt-containing aqueous phase formed during neutralization, at least in an amount sufficient to obtain the phenol of the organic phase saturated with water at room temperature, stirring the hot mixture, allowing the mixture to stratify into two phases, separating the organic phase from the aqueous phase, cooling the separated organic phase to room temperature, thereby crystallizing out the adduct of the bis(4-hydroxyphenyl)alkane and phenol from the mother liquor that consists of phenol saturated with water, and removing phenol from said separated adduct, whereby a residual amount of impurities is subsequently removed from the desired compound, which amount of impurities cannot normally be totally removed in normal subsequent processing steps, and whereby the mother liquor of the crystallization of the adduct consists of phenol saturated with water and substantially all impurities, and whereby after removing the phenol from the separated adduct the highly pure bis(4-hydroxyphenyl)alkane is obtained.

Other bisphenols which may be prepared in pure form in accordance with the process of the present invention include bis(4-hydroxyphenyl)methane,
1,1-bis(4-hydroxyphenyl)ethane,
1,1-bis(4-hydroxyphenyl)propane,
1,1-bis(4-hydroxyphenyl)butane,
1,1-bis(4-hydroxyphenyl)-2-methylpropane,
1,1-bis(4-hydroxyphenyl)heptane,
1,1-bis(4-hydroxyphenyl)-1-phenylmethane,
bis(4-hydroxyphenyl)-4-methylphenylmethane,
bis(4-hydroxyphenyl)-4-ethylphenylmethane,
bis(4-hydroxyphenyl)-4-isopropylphenylmethane,
bis(4-hydroxyphenyl)-4-butylphenylmethane,
bis(4-hydroxyphenyl)benzylmethane,
bis(4-hydroxyphenyl)-1-furylmethane,
2,2-bis(4-hydroxyphenyl)butane,
2,2-bis(4 - hydroxyphenyl)pentane (melting point 149–150°),
2,2-bis(4-hydroxyphenyl)-4-methylpentane,
2,2 - bis(4 - hydroxyphenyl)heptane (boiling point 198–200° C. at a pressure of 0.3 mm. mercury gauge),
2,2-bis(4-hydroxyphenyl)octane,
2,2-bis(4-hydroxyphenyl)nonane (melting point 68° C.),
1,1-bis(4-hydroxyphenyl)-1-phenylethane,
1,1-bis(4-hydroxyphenyl)-1-(1-furyl)ethane,
3,3-bis(4-hydroxyphenyl)pentane,
4,4-bis(4-hydroxyphenyl)heptane,
1,1-bis(4-hydroxyphenyl)cyclopentane,
1,1-bis(4-hydroxyphenyl)cyclohexane,
2,2-bis(4-hydroxyphenyl)decahydronaphthalene (melting point 18° C.).

Particularly suitable are mixtures of phenol and water such as are obtained by saturating phenol with water at room temperature. These mixtures contain about 76 percent of phenol and 24 percent of water. The hot aqueous phenol solutions readily dissolve the condensation products, but only to a small extent when cold. The resinous and colored impurities remain almost completely in the mother liquor. When cooling the hot solution of the condensation products, clear crystals precipitate out containing the condensation products along with phenol. Thus the well formed crystals obtained upon cooling a solution of 2,2-bis(4-hydroxyphenyl)propane in 76 percent phenol contain about 1 mol of phenol per mol of the bisphenolic condensation product. From these products, the pure bisphenol can be obtained in a simple manner by separating the residual phenol by distillation or extraction with warm water.

It is expedient to effect the condensation into di-(monohydroxyphenyl)-alkanes with mineral acids, for example, concentrated hydrochloric acid or a strong sulphuric acid, with an excess of phenol, preferably 4 mols of phenol per mol of carbonyl compound, and to melt the solid reaction mixture thus obtained after the addition of a neutralizing agent such as sodium hydroxide, lime and the like. A liquid organic phase and an aqueous salt solution are thus obtained which can easily be separated. After separating the salt solution, the organic layer is saturated with water and allowed to cool, if desired after filtration. On cooling, the adducts containing about 1 mol of the condensation product linked to 1 mol of phenol are separated in a pure form. A small portion of the condensation product remains in the mother liquor along with the colored impurities and the resinous by-products. The condensation product obtained from the crystals by separating the phenol by distillation or extraction complies with the exacting requirements as to purity such as are involved for example in their use as intermediate products in the manufacture of plastics.

The following examples are given for the purpose of illustrating the invention.

*Example 1*

To a solution of 70 parts by weight of acetone in 452 parts by weight of phenol (molecular ratio of acetone to phenol of 1:4) cooled to 20° C. are added 120 parts by weight of 38 percent hydrochloric acid. The temperature of the reaction mixture rises to 65° C. within 24 hours, and the mixture completely crystallizes within 4 more days.

The crystalline mass is then melted by the introduction of water vapor and neutralized with 40 percent sodium hydroxide solution. The sodium chloride solution separating out at the bottom is removed, the organic solution stirred with 100 parts of water having a temperature of about 80° C. for 10 minutes and the supernatant aqueous layer thus formed is separated. The organic solution is then cooled to 25° C. with stirring and the crystalline magma or pulp that is thus formed is separated by centrifugation.

320 parts by weight of white crystals having a melting point of 95–110° C. are thus obtained from which 80 parts by weight of phenol are distilled off with water vapor.

The residue consists of 224 parts by weight of 2,2-bis(4-hydroxyphenyl)propane in the form of white crystals having a melting point of 156.2° C. in an amount equivalent to a yield of 82 percent of the theoretical. The chlorine content of the product is 0.001%.

The brownish mother liquor (250 parts by weight) obtained in the centrifugation step is distilled at a pressure of 12 mm. mercury gauge, producing a condensate consisting of 71 parts of water and 139 parts by weight of phenol. 40 parts by weight of resinous products mixed with 2,2-bis(4-hydroxyphenyl)propane remain behind.

The 2,2-bis(4-hydroxyphenyl)propane thus prepared is outstandingly suitable for the manufacture of polyesters according to the processes described in the United States patents and patent applications referred to hereinbefore.

In order to compare the process of the invention with the foregoing known process in which an adduct of phenol and the bisphenol is formed, phenol is reacted with dimethyl ketone in a mol ratio of phenol to ketone of 10:1 at about 75° C. in the presence of hydrogen chloride and a small amount of methyl mercaptan(methanethiol). The resulting reaction mixture comprising 2,2-bis(4-hydroxyphenyl)propane and unreacted phenol is quenched with water, producing an aqueous mixture containing about 70% of water. Said mixture is neutralized by the addition of aqueous caustic soda solution and permitted to stratify at 50° C., thereby forming a liquid phenolic phase and a liquid aqueous phase. The phenolic phase is separated and cooled to 25° C. thereby crystallizing out the adduct of 2,2-bis(4-hydroxyphenyl)propane and phenol. The crystallized adduct is separated from the phenolic mother liquid and decomposed, splitting off the phenol of the adduct by water-steam distillation. The residue consists of 2,2-bis(4-hydroxyphenyl)propane having a solidification point of 154.8 to 156.0° C. The chlorine content of the product is 0.068%.

*Example 2*

To a mixture of 45 parts by weight of phenol, 10 parts by weight of methyl propyl ketone and 0.86 part by weight of thioglycolic acid cooled to 25° C., there are added dropwise with stirring within 3 hours, 12 parts by weight of 98 percent sulphuric acid, care being taken by providing sufficient cooling that the temperature does not rise above 50° C.

The reaction mixture which is at first liquid and becomes a thick orange-red crystalline pulp is melted after 8 hours by the introduction of water vapor and neutralized by the addition of 20 percent sodium hydroxide solution.

Thereupon about 2 parts by weight of unreacted methyl propyl ketone is recovered by distillation with steam and the aqueous layer (about 80 parts by weight) separating at the bottom is removed from the residual solution. The organic solution is washed with 50 parts by weight of water and the aqueous solution now formed on the top is again separated.

The combined aqueous solutions contain 11.5 parts by weight of partially sulphonated phenol in addition to sodium sulphate.

The organic solution is cooled to 20° C. and the crystalline pulp that is thus formed is subjected to separation by centrifugation.

25.7 parts by weight of white crystals having a melting point of 92–110° C. are thus obtained which contain 21.1 parts by weight of 2,2-bis(4-hydroxyphenyl)pentane, 4.1 parts by weight of phenol and 0.5 part by weight of water, whilst the yellowish mother liquor contains 12.5 parts by weight of phenol, 1.3 parts by weight of resin and 5.7 parts by weight of water.

From the crystals that were separated by centrifugation, 2,2-bis(4-hydroxyphenyl)pentane is freed from phenol by distillation with water vapor and thus obtained as a white powder having a melting point 150–151° C. The yield is 71 percent of the theoretical.

The 2,2-bis(4-hydroxyphenyl)pentane thus obtained is particularly suitable for the manufacture of polyesters according to the processes described in the United States patents and patent applications referred to hereinbefore.

*Example 3*

Proceeding as described in Example 2 but isolating the pure 2,2-bis(4-hydroxyphenyl)pentane from the adduct with the phenol not by distilling the phenol with water vapor but by washing the crystals several times with warm water, the product obtained has a purity that is the same as the product of Example 2.

*Example 4*

Proceeding in a manner analogous to that described in Example 1, pure 2,2-bis(4-hydroxyphenyl)butane and 3,3-bis(4-hydroxyphenyl)pentane are obtained from methyl ethyl ketone and diethyl ketone, respectively, instead of acetone. These products, too, are so pure that they are suitable for the production of high molecular polyesters.

*Example 5*

A solution of 400 kilograms of phenol and 78 kilograms of cyclohexanone is cooled to 10° C. and subsequently mixed with 80 kilograms of 38 percent aqueous hydrochloric acid. After 15 to 20 hours the mixture is partly crystallized out while the temperature rises to to 65° C. during the exothermic reaction. It is allowed to stand for another 6 days. The product is then melted and neutralized by charging steam thereinto while the mixture is stirred and addition of about 60 kilograms of 50 percent sodium hydroxide, and the aqueous sodium chloride solution that separates at the bottom is removed. The organic upper layer is stirred with about 500 liters of hot water having a temperature of 90° C. and the organic layer formed at the bottom is filtered and crystallized. After centrifuging, 252 kilograms of mixed crystals and 250 kilograms of liquid phenol are obtained from the crystalline pulp. From the mixed crystals 50.4 kilograms of phenol are obtained by distillation, 176 kilograms of pure 1,1-bis(4-hydroxyphenyl)cyclohexane remaining as a residue. The yield is 82.2 percent of the theoretical, and the product has a melting point of 186° C. From the phenol mother liquor are obtained 175.8 kilograms of phenol and 16.4 kilograms of resinous bisphenol as a residue. 35.8 kilograms of phenol are recovered from the various washing liquors by extraction.

We claim:

1. A process for the production of a substantially pure bis(4-hydroxyphenyl)alkane of the group consisting of compounds having the formulae

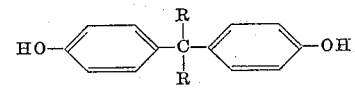

and

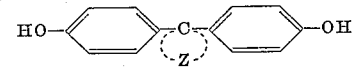

in which
  each R is a radical of the group consisting of hydrogen, branched and unbranched monovalent saturated aliphatic hydrocarbon radicals containing up to 10 carbon atoms, monovalent saturated cycloaliphatic radicals, monovalent aryl-substituted saturated aliphatic hydrdocarbon radicals whose side chains contain up to 4 carbon atoms, phenyl and furyl radicals, and
  Z represents the carbon and hydrogen atoms required to complete a saturated cycloaliphatic hydrocarbon ring, which comprises
  (a) reacting together a mixture consisting essentially of a carbonyl compound of the group consisting of aldheydes and ketones having the formula R—CO—R and ZC=O in which the radicals R and Z have the foregoing significance with a stoichiometric excess of phenol and an acid catalyst,
  (b) melting the resulting reaction mixture containing phenol and the adduct of phenol and the bis(4-hydroxyphenyl)-alkane and adding thereto an amount of a concentrated aqueous solution of an alkali sufficient to neutralize the same,
  (c) separating the resulting aqueous phase from the liquid organic phase,
  (d) adding to the separated liquid organic phase with stirring an amount of hot water that is at least sufficient to product with the phenol contained in the organic phase an aqueous solution of phenol which contains enough water to saturate all the phenol contained therein at room temperature,
  (e) allowing the mixture to stratify into two liquid phases, and separating the liquid organic phase from the aqueous phase,
  (f) cooling the separated liquid organic phase to room temperature, thereby precipitating crystals of the adduct of phenol and the bis(4-hydroxyphenyl)alkane,
  (g) separating the adduct of phenol and the bis(4-hydroxyphenly)alkane from the aqueous mother liquid containing phenol saturated with water, and (h) decomposing the separated adduct to liberate the phenol combined therein and expelling the phenol, leaving the substantially pure bis(4-hydroxyphenyl)alkane.

2. A process as defined in claim 1 in which the temperature of the hot water that is added to the separated organic phase is between about 80 and 90° C.

3. A process for the production of substantially pure 2,2-bis(4-hydroxyphenyl)propane which comprises
(a) reacting together a mixture consisting essentially of approximately 70 parts by weight of acetone, approximately 452 parts by weight of phenol and approximately 120 parts by weight of concentrated hydrochloric acid at a temperature of approximately 65° C., to produce a reaction mixture containing phenol and an adduct of equimolecular proportions of phenol and 2,2-bis(4-hydroxyphenol)propane that solidifies to a crystalline mass at room temperature,
(b) melting the resulting reaction product and adding thereto an amount of a concentrated aqueous solution of sodium hydroxide sufficient to neutralize the same,
(c) separating the resulting liquid organic phase from the aqueous sodium chloride-containing aqueous phase,
(d) adding approximately 100 parts by weight of hot water at a temperature of approximately 80° C. to the separated liquid organic phase and stirring the same,
(e) allowing the mixture to stratify into two liquid phases, and separating the liquid organic phase from the aqueous phase,
(f) cooling the separated liquid organic phase to room temperature, thereby precipitating crystals of the adduct of phenol and 2,2-bis(4-hydroxyphenyl)propane from the aqueous mother liquor containing phenol saturated with water, and
(g) decomposing the separated adduct by subjecting the same to distillation with steam, thereby carrying off the liberated phenol, and
(h) recovering the resulting substantially pure crystals of 2,2-bis(4-hydroxyphenyl)propane.

References Cited by the Examiner

UNITED STATES PATENTS 2,791,616   5/57   Luten _____ 260—619

LEON ZITVER, *Primary Examiner.*

DUVAL T. McCUTCHEN, *Examiner.*